United States Patent [19]

Wright

[11] Patent Number: 5,361,397

[45] Date of Patent: Nov. 1, 1994

[54] COMMUNICATION DEVICE AND SYSTEM CAPABLE OF AUTOMATIC PROGRAMMABLE ENERGIZING

[75] Inventor: James A. Wright, Coral Springs, Fla.

[73] Assignee: Motorola, Inc., Schaumburg, Ill.

[21] Appl. No.: 123,600

[22] Filed: Sep. 20, 1993

Related U.S. Application Data

[63] Continuation of Ser. No. 749,811, Aug. 26, 1991, abandoned.

[51] Int. Cl.$^5$ ............................................... H04B 7/00
[52] U.S. Cl. .................................. 455/38.2; 455/38.3; 455/70; 455/343; 340/825.44
[58] Field of Search ...................... 455/38.2, 38.3, 343, 455/70; 340/825.44, 825.47

[56]  References Cited

U.S. PATENT DOCUMENTS

| | | | |
|---|---|---|---|
| 3,937,004 | 2/1976 | Natori et al. | 368/11 |
| 4,194,153 | 3/1980 | Masaki et al. | 455/31.1 |
| 4,398,192 | 8/1983 | Moore et al. | 340/825.44 |
| 4,449,248 | 5/1984 | Leslie et al. | 455/38.3 |
| 4,523,332 | 6/1985 | Mori | 455/343 |
| 4,745,408 | 5/1988 | Nagata et al. | 340/825.44 |
| 4,860,005 | 8/1989 | Deluca et al. | 455/343 |

FOREIGN PATENT DOCUMENTS

| | | | |
|---|---|---|---|
| 0109927 | 4/1989 | Japan | 455/343 |
| 0162842 | 6/1990 | Japan | 455/38.3 |
| 3286632 | 12/1991 | Japan | 455/38.3 |
| 2136616 | 9/1984 | United Kingdom | 455/343 |

Primary Examiner—Reinhard J. Eisenzopf
Assistant Examiner—Andrew Faile
Attorney, Agent, or Firm—R. Louis Breeden; Thomas G. Berry

[57] ABSTRACT

The present invention allows for communication devices (106 and 108) operating in a communication system (100) to be guaranteed of not missing any important system message sent by the communication system controller (104). By transmitting a system time code to the communication devices (106 and 108) the system controller (104) can inform the communication devices when they need to be ready to receive information from the system controller (104). Once the time to receive a message is determined, the communication devices (106 and 108) turn on even if they were presently turned off or in a battery saving (low power) condition.

12 Claims, 2 Drawing Sheets

COMMUNICATION DEVICE AND SYSTEM CAPABLE OF AUTOMATIC PROGRAMMABLE ENERGIZING

This is a continuation of application Ser. No. 07/749,811, filed Aug. 26, 1991, now abandoned.

TECHNICAL FIELD

This invention relates generally to communication systems and more specifically to radio communication systems.

Background

In present day communication systems such as paging systems, portable electronic mail (E-mail) systems, roaming computer networks, and the other similar communication systems which utilize portable wireless battery operated receivers, the issue of extending battery life becomes very important. The techniques employed in the art for extending the battery life of these portable receivers are numerous and include manually or automatically turning off certain circuits in the portable communication devices (such as portions of the portable communication device's receiver section) for certain predetermined periods of time.

A couple of prior battery saving techniques include U.S. Pat. No. 4,860,005- Deluca et al. (1985) which teaches the automatic turn on/off of a communication receiver by utilizing a real-time clock which is programmed to turn on/off at preset periods of time. Another prior battery saving technique is disclosed in U.S. Pat. No. 4,398,192- Moore et al. (1983). Moore et al, provides for battery saving for a pager by transmitting the address code assigned to a particular pager a predetermined interval of time following a sync signal, thus the pager can be powered-down until the approximate time period in which its address code would be transmitted.

Unfortunately, although these battery saving techniques increase the battery life of the communication devices, they pose a major problem for systems which need to send network or system update information to all of the devices operating in the communication system. The same communication device access problem occurs to communications units which have been turned off by their users, thereby causing the units to miss important system update information.

A need exists in the art for a way of guaranteeing the delivery of system messages to communication devices which are either in a battery saving mode or which have been powered down by their users.

SUMMARY OF THE INVENTION

Briefly described, the present invention contemplates a communication device capable of automatically energizing (turning on) even if the communication device is presently off or in a battery saving (low power) condition in order to guarantee the reception of important system information messages.

According to the invention, a communication device capable of operating in a communication system having a control station which transmits information signals that include system time codes to the communication device is described. The communication device being capable of operating in a first high power consumption mode and in a second low power consumption mode. The communication device comprises, a receiver means for receiving information signals from the control station and a decoder means responsive to the receiver means for decoding the system time code from the information message. The communication device 200 further comprises a storage means for storing the system time code and a timer means for measuring an interval of time. Finally, the communication device includes a controller means responsive to the timer means for modifying the system time code and for making the communication device operate for a predetermined period of time in the first high power consumption mode upon the system time code reaching a predetermined value.

In another aspect of the present invention a method of automatically energizing a communication device is described.

In still another aspect of the present invention a communication system capable of automatically energizing communication devices operating within the communication system is described.

DETAILED DESCRIPTION OF THE PREFERRED EMBODIMENT

Figure 1:
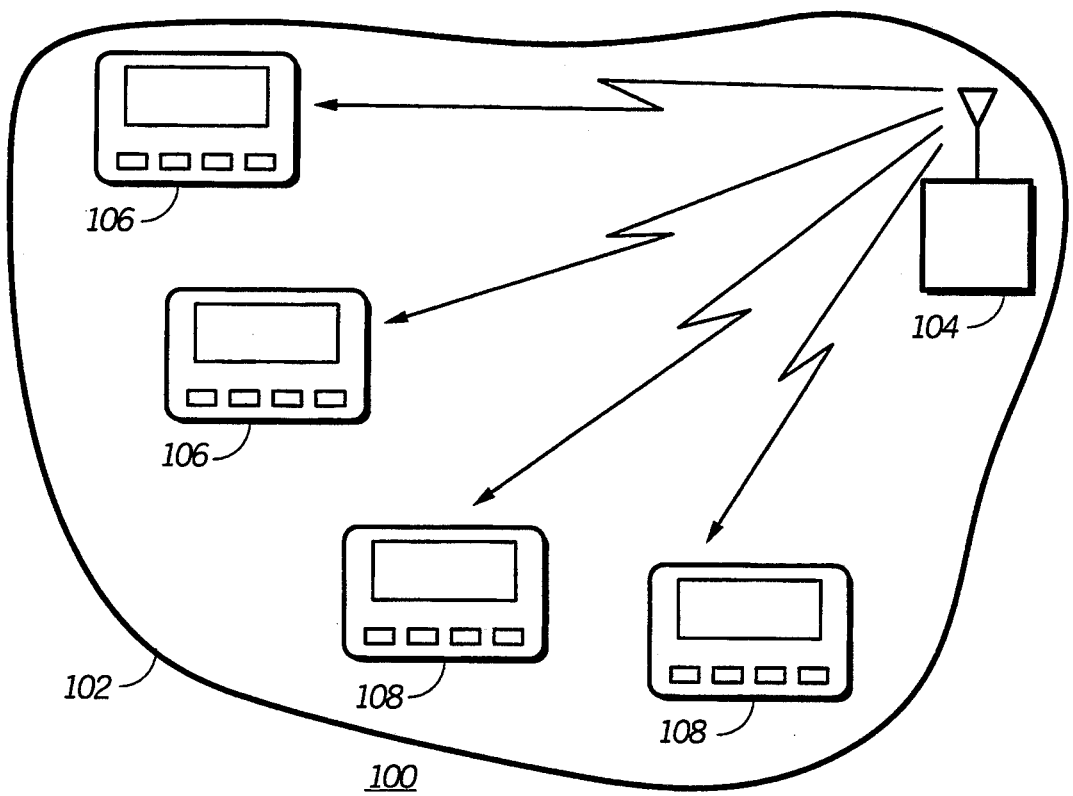
FIG. 1 is a diagram of a communication system in accordance with the present invention.

Referring to the drawings and more specifically to FIG. 1, there is shown a communication system 100 in accordance with the present invention. Communication system 100 for the purposes of the following description can be any type of radio communication system, but more specifically, for the purposes of this description, system 100 will be a paging system as known in the art. Paging system 100 includes a central control station or terminal 104 which sends information to pagers 106 and 108 over service (coverage) area 102. Voice or data is selectively transmitted from base 104 to any of the pagers 106 or 108 operating in system 100. Control station 104 comprises a computer system as known in the art, with appropriate memory and input capabilities that are coupled to a communication transmitter in order to transmit information messages to the individual communication devices (106 and 108).

Once the voice or data is received by the pager, the information is decoded and the decoded message is either displayed, in the case of data, or annunciated over the pager's speaker, in the case of a voice message. Pagers in groups 106 and 108 each have different individual pager identification numbers (ID's) which are used to selectively address each of the pagers individually, plus they also have group ID's in order for the paging terminal 104 to address them as a group (either group 106 or 108).

In present day paging systems such as those used to transmit E-mail, it becomes very important for the paging terminal 104 to be able to transmit information to all, a select group, or an individual communication unit in the system 100 at any given time (106 and 108). These transmissions can include information such as systems news, general information messages to all users, information to update the operating systems of the communication units (e.g. over-the-air programming), etc. Unfortunately, it becomes almost impossible to guarantee that all units will be able to receive the messages sent by the paging terminal 104 since some of the units (106 and 108) may be in battery saver mode (low power mode), which can include having their receivers turned off, or the communication units may be completely turned off at the time the paging terminal 104 wants to transmit the message.

The present invention provides for a simple, but yet very effective way, of guaranteeing that communication units will be operational at the time that important system information is to be transmitted. The invention assures that all units using system 100 will be in a position to receive system messages whenever the system chooses to send them (paging terminal 104). In a typical system, this would probably occur once a day during a time period when the systems normal traffic load is at a minimum. Because these times are unknown and subject to change, it is imperative that the system 100 can control the "wake up" period of each of the units (106 and 108) automatically.

A single system 100 may have a number of "service groups", such as groups 106 or 108, each of which the paging terminal 104 may desire to send specific service group messages at different times. This necessitates the ability to allow for multiple automatic "turn on" of different groups of communication device groups at different times. For example, one group of communication devices 106 may receive a system update at one specific time, while other units 108 may receive a system update at another time. The present invention accomplishes this by the use of a system time code (hereinafter referred to as "STC") which directs the action of each of the communication units using the network. The STC is transmitted by the paging terminal 104 to all devices on the system 100, either all at once, or selected groups of devices 106 or 108 at different times, or individually. The STC is preferably appended to standard system messages transmitted by paging terminal 104. Paging terminal 104 determines the value of the STC transmitted to each of the pagers (106 and 108) and constantly modifies the value of the STC on a real time basis. This allows all of the pagers (106 and 108) to become synchronized with paging terminal 104 since their STC values should be the same at any given period of time. All of the pagers (106 and 108) will beginning decrementing the STC value as soon as it is received, in order to reach the point at which the STC reaches zero, indicating that it is time for the pager to turn on.

Figure 2:
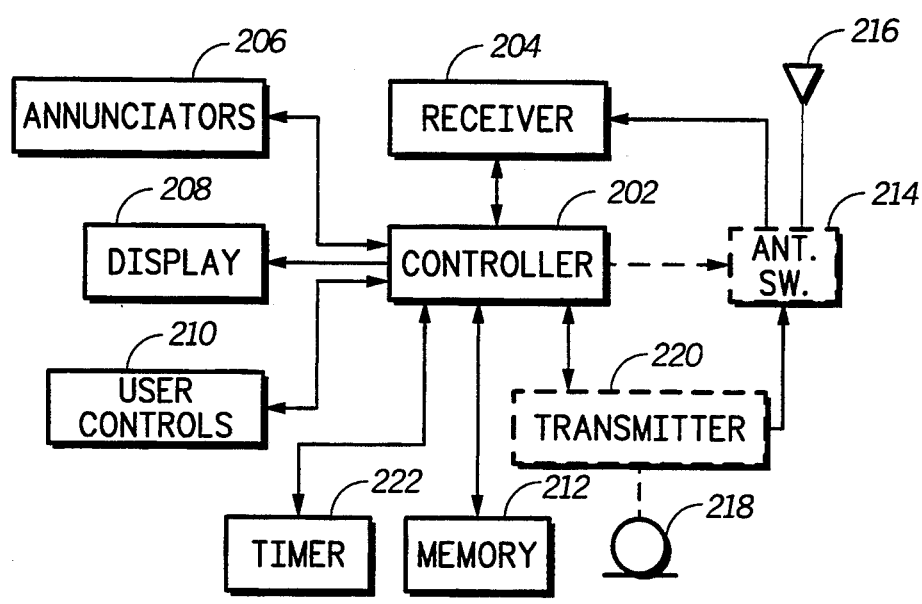
FIG. 2 is a block diagram of a communication device in accordance with the present invention.

In FIG. 2, a block diagram of a radio communication device 200 in accordance with the present invention is shown. Communication device 200 is similar to communication devices 106 and 108 of FIG. 1. The communication device 200 comprises a control means such as controller 202 which controls the overall operations of device 200. Controller 202 can be a microprocessor or microcontroller as known in the art. Controller 202 is also responsible for switching communication device 200 from a high power consumption mode (all of the communication device's circuits being operational) to a low power consumption mode (battery saving mode). The low power consumption mode is used to conserve battery life and can include the turning off of certain circuits in the communication device 200 as known in the art under the control of controller 202. Preferably, controller 202 disables receiver 204 and certain other circuits found in device 200 while operating in the low power consumption mode. This allows lower power consumption for device 200 thereby extending the device's battery life.

Coupled to the control means 202 is a storage means in the form of conventional memory which can include ROM, EEPROM, RAM, etc. It is in the storage means 212 where a system time register (hereinafter referred to as "STR") is located. It is in the STR where the system time code (STC) is stored, once the STC is received from paging terminal 104. Communication device 200 also includes a conventional receiver 204 which is utilized for selectively receiving the radio frequency (RF) signals which are gathered by antenna 216. A timer means 222 such as a real time clock as known in the art, or a precision oscillator circuit is also found coupled to controller 202. Timer means 222 allows for the synchronization of all the units in system 100. Timer means 220 is preferably a precision time keeping unit which can remain accurate while still operating in different environmental conditions which communication unit 200 might be exposed to during normal operation.

Communication unit 200 further includes a display 208 for displaying received information which is decoded by controller 202. A set of annunciators 206 such as LED's and a speaker are also part of communication device 200, as well as other user controls 210 such as an on/off switch, volume control, etc. Optionally, communication device 200 can include a conventional transmitter 220 and antenna switch 214 in the case that communication device 200 is a transceiver unit such as a portable radio. A standard microphone 218 can be coupled to transmitter 220 so that voice message can be transmitted.

Upon reception of a message by receiver 204 from paging terminal 104, the system time code (STC) is "stripped off" (decoded) from the received message by the control means 202 which uses a decoder means such as a conventional software program to decode the incoming information (in the case the message contains a STC). The controller 202, then stores the STC in the system time register (STR), located in storage means 212. Preferably, the STR register is decremented (value of STC is decremented) each time that the device's real time clock 222 increments in time. Those skilled in the art will realize that the STR can be decremented after any period of time has elapsed, for example the STR can be decremented every 10 seconds of elapsed time, every second, etc. The amount of time elapsed in the timer means 222 per each decrement of the STR can be programmable and be changed by paging terminal 104.

The STC word can be any length, for example the STC could be a 8 bit binary code word. The longer the STC, the longer will the message transmitted by paging terminal 104 become, since the STC is preferably appended to the message being transmitted by terminal 104. The longer the STC code word and the shorter the amount of time elapsed in the timer means 220 per decrement of the STC, the greater will be the accuracy with which the communication units (106 and 108) will automatically energize.

The length of time the communication device (106 and 108) stays energized (turned on if previously in battery saver mode, or if previously turned off) can be for the length of the present system message, or for a predetermined period of time that can be either be sent over the air in the message itself, or a period of time which had been stored previously in storage means 212 (sent along with the STC).

Figure 3:
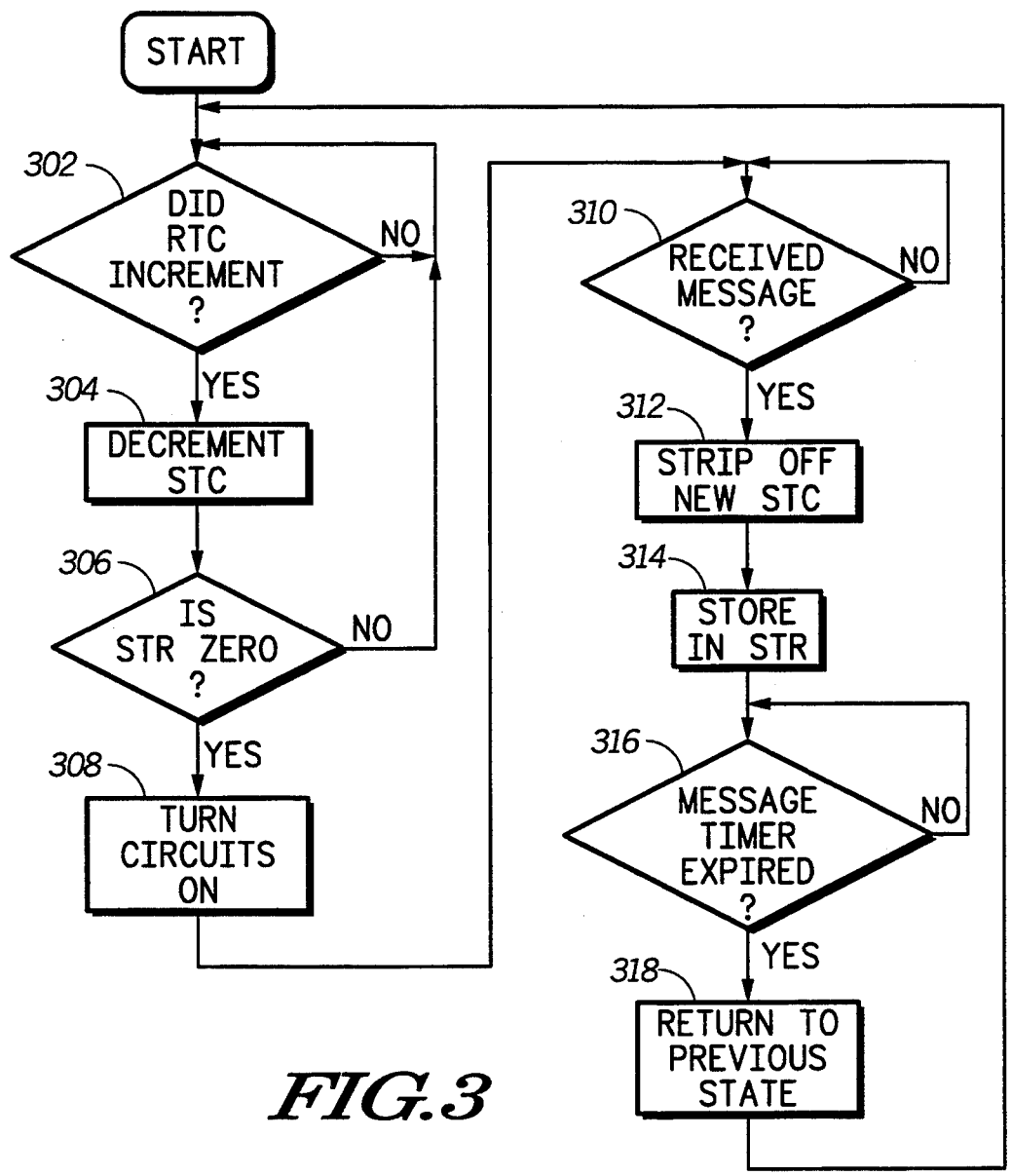
FIG. 3 is a flow diagram illustrating a typical operating sequence in accordance with the present invention.

Referring now to FIG. 3, a typical sequence of operation of the present invention will be presented. The sequence shown in FIG. 3 starts with the communication device having a STC already stored in memory 212 in the system time register (STR). In step 302, the control means 202 determines if the device timer (or real time clock, "RTC") has incremented in time, this can be determined by an output port coming from the timer 222 which "pulses" every time the timer 222 is incremented, or in the case of a real time clock the control means 202 can compare the exact time (Hours, Minutes, Seconds, Fractions of seconds, etc) with a previously stored time, to determine if the necessary period of time has elapsed in order to decrement the STC. If the timer means 222 has not incremented the necessary period of time, the routine repeats step 302, while if the timer has incremented the necessary period of time, the routine moves on to step 304.

In step 304, the system time code ("STC") is decremented, with the amount that the STC is decremented per each increment of the RTC controlled by the resolution level previously discussed. For example, the system time code can be decremented every second, or every hour, all depending on the resolution that one wants to attain. In decision step 306, it is then determined if the STR equals zero (STC has reached zero), if the STR has not yet reached zero, the routine returns to step 302. If the STR has reached zero, in step 308, the communication device 200 is turned on ("energized") so that the system message that will be sent by paging terminal 104 may be received, even if the device 200 was previously turned off or in a battery saving mode, thereby guaranteeing that all devices within range of system 100 (in coverage area 102) are capable of receiving the message being sent by paging terminal 104.

In decision step 31 0, it is then determined if the system update message has been received, if no message has been received, the routine keeps waiting until a message is received from control terminal 104. Once the system message has been received, which can be determined by the use of an end of message flag or other well known methods of indicating the termination of a message, in step 312, the new incoming system time code ("STC") is stripped off the new system message. Then in step 314, the new STC is stored in the system time register ("STR") in order to once again synchronize the communication device 200 and the paging terminal 104.

To assure that the communication devices 106 and 108 are "synchronized" to the system time clock (STC), it would be preferred, but not mandatory, to include the current STC value in each individual message received by a device user. For example, after each message (page) to that individual communication unit (106 or 108), the STC would be updated by the paging terminal 104 continuously on a per system, per group, or per individual radio if so desired. Any time a message is directed to a pager (such as pagers 106 or 108) the paging terminal can send the updated STC value in order to guarantee that the communication unit and paging terminal 104 are synchronized in time. Since present day timing means 222 such as real time clocks are very accurate, it would be possible to only have to upgrade the STC once a day or less.

In order to guarantee that a communication device does not lose synchronization with the system 100, each communication device (106 and 108) can have stored in the device itself a default turn on code word, that would be continuously decremented, and would turn on the device if the device does not receive a system message or STC update within a given period of time. For example, the default turn on code word would turn on the device after a full day of not receiving a system message, or STC update even if the device were in a low power (battery saving mode) or totally turned off. If the device is energized due to the default code word reaching zero, the device would stay on until a message directed to the device containing a new STC is received, even if the device was turned off by the communication device user. This device code word would guarantee, that no communication device in system 100 would lose synchronization with the system 100.

In summary, the present invention provides for an effective way of guaranteeing that communication units (106 and 108) in a communication system are turned on in order to guarantee the reception of system messages. The use of a STC code allows all of the pagers in a system to be time synchronized with the control terminal 104, either individually, as a group, or as an overall system. Utilizing an STC is more effective than the prior art method of relying on a real time clock stored in the radios to energize the communication devices at predetermined periods of time, since in modern wide area systems different units may be in different time zones, or the real time clocks in each of the units (106 and 108) may have been set incorrectly by the users. By making the system 100, via paging terminal 104 in control of the turn on time of the communication devices, the system 100 guarantees that important system messages are not missed. By updating the STC any time a device receives a message, increases the accuracy of the turn on time of the individual communication devices, without overly increasing the system transmission overhead times.

What is claimed is:

1. A communication device operating in a communication system having a control station which periodically transmits an information message having a system time code appended thereto to the communication device, the communication device utilizing a battery saving system having a fully active mode for receiving the information message, and a battery saver mode for saving battery life, the communication device comprising:

receiver means for receiving the information message from the control station;

decoder means responsive to the receiver means for decoding the system time code from the information message;

storage means for storing the system time code;

timer means coupled to the storage means,
wherein the timer means measures an interval of time determined by the system time code, and
wherein the timer means remains operable during both the fully active mode and the battery saver mode, and further even after the communication device has been turned off by a user; and controller means responsive to the timer means,
wherein the controller means effects temporary operation of the communication device in the fully active mode for a period sufficient to receive a further information message in response to a determination at a time by the timer means that said interval of time has expired, and
wherein said temporary operation in the fully active mode is effected regardless of the mode of the battery saving system at the time of said determination, and further even after the communication device has been turned off by the user.

2. The communication device of claim 1, wherein a value representing a predetermined period of time is stored in the storage means, and wherein the controller means maintains said temporary operation of the communication device in the fully active mode for said predetermined period of time after effecting said operation.

3. The communication device of claim 1, wherein the controller means maintains said temporary operation of the communication device in the fully active mode for as long as the receiver means is receiving said further information message.

4. The communication device of claim 1, wherein the timer means upon incrementing a preset period of time sends an increment signal to the controller means, which upon receiving the increment signal sends a signal to the storage means in order to decrement the system time code by a predetermined amount.

5. The communication device of claim 2 wherein the controller means controls the communication device to operate for said predetermined period of time in the fully active mode when the system time code equals zero.

6. The communication device of claim 1, wherein the storage means also stores a default turn-on code, and wherein the controller means effects a receive operation of the communication device at a default time based upon said default turn-on code if the communication device has not received said system time code before said default time, and wherein said receive operation is effected even if the communication device has been turned off by the user.

7. The communication device of claim 6, wherein the controller means maintains said receive operation until said information message having said system time code has been received by the communication device, even if the user attempts to turn off the communication device before the receipt of said information message.

8. A communication system capable of automatically energizing a communication device operating in the system, comprising:
a control station capable of selectively addressing the communication device and of periodically transmitting an information message having a system time code; and
the communication device for receiving the information message transmitted by the control station, wherein the communication device utilizes a battery saving system having a fully active mode for receiving the information message, and a battery saver mode for saving battery life, the communication device comprising:
a receiver for receiving the information message from the control station;
a decoder responsive to the receiver for decoding the system time code from the information message;
a memory for storing the system time code;
a timer coupled to the memory,
wherein the timer measures an interval of time determined by the system time code, and
wherein the timer remains operable during both the fully active mode and the battery saver mode, and further even after the communication device has been turned off by a user; and
a controller responsive to the timer,
wherein the controller effects temporary operation of the communication device in the fully active mode for a period sufficient to receive a further information message in response to a determination at a time by the timer that said interval of time has expired, and
wherein said temporary operation in the fully active mode is effected regardless of the mode of the battery saving system at the time of said determination, and further even after the communication device has been turned off by the user.

9. The communication system of claim 8, wherein a value representing a predetermined period of time is stored in the memory, and wherein the controller maintains said temporary operation of the communication device in the fully active mode for said predetermined period of time after effecting said operation.

10. The communication system of claim 8, wherein the controller maintains said temporary operation of the communication device in the fully active mode for as long as the receiver is receiving said further information message.

11. The communication system of claim 8, wherein the memory also stores a default turn-on code, and wherein the controller effects a receive operation of the communication device at a default time based upon said default turn-on code if the communication device has not received said system time code before said default time, and wherein said receive operation is effected even if the communication device has been turned off by the user.

12. The communication system of claim 11, wherein the controller maintains said receive operation until said information message having said system time code has been received by the communication device, even if the user attempts to turn off the communication device before the receipt of said information message.

* * * * *